(No Model.)
M. BRAY.
MANUFACTURE OF REED PLATES AND REEDS.
No. 312,322. Patented Feb. 17, 1885.
 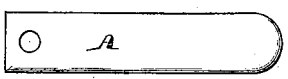 
Fig. 3.      Fig. 1.      Fig. 2.
 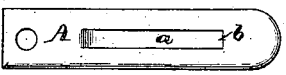 
Fig. 6.      Fig. 4.      Fig. 5.
  
Fig. 9.      Fig. 7.      Fig. 8.
 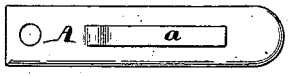 
Fig. 12.      Fig. 10.      Fig. 11.
 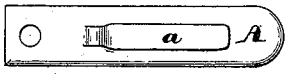 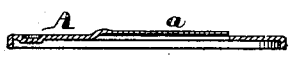
Fig. 15.      Fig. 13.      Fig. 14.
 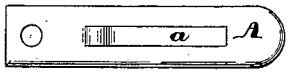 
Fig. 18.      Fig. 16.      Fig. 17.
Witnesses:
Nettie L. Ricker
Walter E. Lombard
Inventor:
Mellen Bray,
by N. C. Lombard
Attorney.

UNITED STATES PATENT OFFICE.

MELLEN BRAY, OF NEWTON, MASSACHUSETTS.

MANUFACTURE OF REED-PLATES AND REEDS.

SPECIFICATION forming part of Letters Patent No. 312,322, dated February 17, 1885.

Application filed May 1, 1884. (No model.)

*To all whom it may concern:*

Be it known that I, MELLEN BRAY, of Newton, in the county of Middlesex and State of Massachusetts, have invented certain new and useful Improvements in the Manufacture of Reeds and Reed-Plates for Musical Instruments, of which the following, taken in connection with the accompanying drawings, is a specification.

My invention relates to the manufacture of reeds and reed-plates for musical instruments; and it consists in certain novel processes of treating the metal to produce the desired result of a perfect reed and reed-plate formed from a single piece of thin sheet metal, and having a clean-cut throat and a tongue reduced to the desired thickness by the combined operations of milling and compression, and to the proper degree of hardness and resiliency by compression, which will be readily understood by reference to the description and claims to be hereinafter given.

Figures 1, 2, and 3 of the drawings illustrating my invention are respectively a plan, a longitudinal section, and a transverse section, of a blank after it has been subjected to the first striking-up or shaping operations. Figs. 4, 5, and 6 are similar views of the same blank after the operation of punching the tongue has taken place. Figs. 7, 8, and 9 are similar views of the same after the next operation of lifting the tongue into a position above the upper surface of the reed-plate. Figs. 10, 11, and 12 are similar views of the same after the operation of milling the tongue has been performed. Figs. 13, 14, and 15 are similar views of the same after the tongue or reed has been reduced to the required thickness, hardness, and resiliency by compression; and Figs. 16, 17, and 18 are similar views of the same after the tongue has been trimmed to the proper width, and the combined reed and reed-plate is completed and ready for the market.

My present invention is an improvement upon the inventions described in Letters Patent No. 253,262, granted to me February 7, 1882, and No. 280,789, granted to George W. McClintock and myself July 10, 1883, in the former of which is described a reed and reed-plate made from a single piece of metal, the tongue or reed of which was brought to the required variable thickness by compression, and in the latter of which is described a reed and reed-plate made from a single piece of sheet metal of a thickness but little in excess of the greatest required thickness to be given to the reed or tongue.

I have found by actual experiment that metallic reeds for musical instruments require to be brought to just the right degree of hardness or temper to give the required resiliency, and that if said reeds are made from stock as thick as the reed plates or blocks heretofore generally in use, or even of stock as thick as the thick ends of the base-reeds, or thick enough to make the reed-plate when struck up, as described in said last-mentioned patent, stiff enough, and the reeds or tongues are reduced to the required variable thickness by compression alone, said reeds or tongues will be too hard and brittle, and hence my present invention.

In carrying out my invention I first strike up by means of suitable dies and from a piece of sheet metal of suitable size, shape, and thickness the reed-plate blank A. (Shown in Figs. 1, 2, and 3.) The metal employed must be as thick as the thickest part of the desired reed or tongue to be formed therefrom, and in any case thick enough to give to the reed-plate, when struck up, the requisite stiffness. When the blank has been struck up to the form shown in Figs. 1, 2, and 3, the next operation is to subject it to the action of suitable dies to punch the central portion, $a$, of said blank downward and separate it along two sides and one end from the surrounding metal, as shown in Figs. 4, 5, and 6. By punching the metal downward instead of upward a throat, $b$, is formed in the reed plate or block having clean-cut square corners at its upper side, without the extra expense of milling or dressing the upper surface of the plate or block, as would be necessary if the tongue $a$ were punched from the under side upward. The tongue $a$ is then milled or planed upon its under side to remove a portion of the surplus stock, and then bent upward or raised to a position above the level of the upper surface of the plate A, as shown in Figs. 10, 11, and 12; or the raising of the tongue $a$ may precede the milling, as illustrated in Figs. 7, 8, and 9, and the tongue may be milled upon its upper side. The amount of metal to be removed from the tongue by milling must be only so much as will reduce the tongue to such a thickness that when it is further reduced by compression to the desired variable thickness it shall have the requisite hardness and resiliency.

When the surplus stock has been removed from the tongue and the tongue has been raised above the plate, as above described, the tongue *a* is subjected to pressure to condense it and reduce it to the required variable thickness, as shown in Figs. 13, 14, and 15. The result of such compression is to reduce the thickness of the tongue, and at the same time to increase its width, as shown in Figs. 13 and 15, which necessarily involves trimming said tongue to the required width to properly fit the throat *b* in the plate A. This may be done by means of dies, by milling, or by planing, after which the tongue is pressed downward into the throat *b*, as shown in Figs. 16, 17, and 18, when the combined reed and reed-plate is ready for the market, and requires no more labor expended upon it to fit it for use except the ordinary tuning.

What I claim as new, and desire to secure by Letters Patent of the United States, is—

1. The method of forming a reed and reed-plate from a single piece of metal, which consists in separating the sides and an end of the reed or tongue from the plate and forming the throat by means of suitable dies, bending said tongue to raise it above the upper surface of the plate, subjecting said tongue to pressure to reduce its thickness and condense the metal to the required hardness and resiliency, trimming said tongue to the required width, and then depressing said tongue into its appropriate position in said throat, substantially as described.

2. The process of forming a reed and reed-plate from a single piece of metal, which consists in separating the sides and one end of the reed or tongue from the plate and forming the throat by means of suitable dies, cutting away a portion of the stock in the tongue and bending said tongue to raise it above the upper surface of the plate, subjecting the reduced tongue to pressure to reduce it to the desired variable thickness and condense the metal to the required hardness and resiliency, trimming said tongue to the proper width to fit the throat, and then depressing said tongue into its appropriate position in said throat, substantially as described.

In testimony whereof I have signed my name to this specification, in the presence of two subscribing witnesses, on this 29th day of April, A. D. 1884.

MELLEN BRAY.

Witnesses:
N. C. LOMBARD,
WALTER E. LOMBARD.